US007258395B2

(12) United States Patent
Bataille et al.

(10) Patent No.: US 7,258,395 B2
(45) Date of Patent: Aug. 21, 2007

(54) COMPOSITE BODY FOR A GOLF CAR AND UTILITY VEHICLE

(75) Inventors: Steven R. Bataille, Edgefield, SC (US);
Douglas T. Crow, Martinez, GA (US);
David R. Hardy, Hephzibah, GA (US);
Gary L. Lewis, Evans, GA (US); Paul E. Morgan, Appling, GA (US); Peter A. Mulgrew, Oshkosh, WI (US);
Duane E. Newman, Evans, GA (US);
Gerald C. Skelton, Martinez, GA (US);
Geoff D. Stewart, Evans, GA (US);
Michael L. Welsh, Evans, GA (US)

(73) Assignee: Club Car, Inc., Augusta, GA (US)

( * ) Notice: Subject to any disclaimer, the term of this patent is extended or adjusted under 35 U.S.C. 154(b) by 0 days.

(21) Appl. No.: 10/543,182

(22) PCT Filed: Jan. 23, 2004

(86) PCT No.: PCT/US2004/001760

§ 371 (c)(1),
(2), (4) Date: Feb. 17, 2006

(87) PCT Pub. No.: WO2004/067360

PCT Pub. Date: Aug. 12, 2004

(65) Prior Publication Data

US 2006/0180383 A1 Aug. 17, 2006

Related U.S. Application Data

(60) Provisional application No. 60/442,192, filed on Jan. 24, 2003.

(51) Int. Cl.
*B60J 7/00* (2006.01)
(52) U.S. Cl. .................................. 296/203.01; 296/35.1

(58) Field of Classification Search ........... 296/203.01, 296/181.2, 181.1, 35.1, 901.01, 193.08, 193.09, 296/193.03, 193.04
See application file for complete search history.

(56) References Cited

U.S. PATENT DOCUMENTS

| 2,790,674 A | 4/1957 | Barenyi |
| 2,886,373 A | 5/1959 | Barenyi |
| 3,596,979 A | 8/1971 | Hablitzel et al. |

(Continued)

FOREIGN PATENT DOCUMENTS

EP 1 380 496 A1 1/2004

(Continued)

*Primary Examiner*—Kiran B. Patel
(74) *Attorney, Agent, or Firm*—Michael Best & Friedrich LLP

(57) ABSTRACT

A golf car (10) or utility vehicle having a composite body (58). In some aspects of the invention, the golf car or utility vehicle has a composite body assembly that includes a front clam shell assembly (62) and a rear shell-like body (64). In other aspects, the golf car or utility vehicle includes a composite body assembly having a periphery (118) and one or more decorative body panels (106, 108), the decorative body panels being recessed inwardly relative to the composite body assembly periphery to prevent impacts to the panels.

26 Claims, 17 Drawing Sheets

U.S. PATENT DOCUMENTS

| | | | |
|---|---|---|---|
| 3,836,192 A | | 9/1974 | Wilfert |
| 4,311,204 A | * | 1/1982 | Shupert ..................... 296/35.1 |
| 4,353,857 A | | 10/1982 | Ray et al. |
| 4,378,658 A | | 4/1983 | DeLorean |
| 4,398,758 A | | 8/1983 | Tabares |
| 4,453,763 A | | 6/1984 | Richards |
| 4,545,105 A | | 10/1985 | Kowalsky |
| 4,917,435 A | | 4/1990 | Bonnett et al. |
| 4,930,591 A | * | 6/1990 | Lanius et al. .............. 180/65.1 |
| 5,044,688 A | | 9/1991 | Jacobson |
| 5,193,635 A | | 3/1993 | Mizuno et al. |
| 5,238,267 A | | 8/1993 | Hutchison et al. |
| 5,343,973 A | | 9/1994 | Lanker |
| 5,558,368 A | | 9/1996 | Cerny et al. |
| 5,609,940 A | | 3/1997 | Inaba et al. |
| 5,627,226 A | | 5/1997 | Lustiger et al. |
| 5,836,412 A | * | 11/1998 | Lyles et al. ................ 180/65.1 |
| 5,876,085 A | | 3/1999 | Hill |
| 5,934,745 A | | 8/1999 | Moore et al. |
| 5,939,001 A | | 8/1999 | Heber et al. |
| 6,003,933 A | | 12/1999 | Rinklin |
| 6,073,991 A | | 6/2000 | Naert |
| 6,168,231 B1 | | 1/2001 | Fielding et al. |
| 6,186,584 B1 | * | 2/2001 | Samuelson et al. ......... 296/213 |
| 6,227,594 B1 | | 5/2001 | Pommeret |
| 6,245,415 B1 | | 6/2001 | Keller et al. |
| 6,247,747 B1 | | 6/2001 | Kawanomoto et al. |
| 6,250,410 B1 | * | 6/2001 | Balestrini et al. ...... 296/193.07 |
| 6,260,893 B1 | | 7/2001 | Wilson |
| 6,293,616 B1 | * | 9/2001 | Williams et al. ....... 296/203.01 |
| 6,439,649 B1 | | 8/2002 | Lorenzo et al. |
| 6,457,768 B1 | | 10/2002 | Schroeder et al. |
| 6,460,914 B2 | | 10/2002 | Gille et al. |
| 6,482,508 B1 | | 11/2002 | Persson et al. |
| 6,722,463 B1 | * | 4/2004 | Reese ......................... 180/292 |
| D498,704 S | * | 11/2004 | Bonner et al. ............... D12/16 |
| 2001/0027883 A1 | | 10/2001 | Sasano et al. |
| 2002/0047257 A1 | | 4/2002 | Rondeau et al. |
| 2002/0091218 A1 | | 7/2002 | Ford et al. |
| 2002/0117873 A1 | | 8/2002 | Lorenzo et al. |
| 2002/0135161 A1 | | 9/2002 | Lamb et al. |
| 2002/0175435 A1 | | 11/2002 | Weiland et al. |

FOREIGN PATENT DOCUMENTS

WO        WO97/14602        4/1997

* cited by examiner

COMPOSITE BODY FOR A GOLF CAR AND UTILITY VEHICLE

This application claims priority to U.S. Provisional Application Ser. No. 60/442,192, filed Jan. 24, 2003, the entire contents of which are incorporated herein by reference.

BACKGROUND AND FIELD OF THE INVENTION

The invention relates to golf cars and utility vehicles, and more particularly, to the bodies of such golf cars or utility vehicles.

Vehicles, such as golf cars and utility vehicles, typically include a frame, a plurality of wheels rotatably mounted to the frame and a body mounted to the frame. The body basically functions to cover or enclose vehicle components such as a motor, drive system components, a power source (e.g., batteries or a fuel tank), axle assemblies, etc. Generally, the bodies of such vehicles are formed of numerous panels or similar structural members attached to the frame.

SUMMARY OF THE INVENTION

In one aspect, the present invention is a golf car comprising a frame and a composite body assembly mounted on the frame and configured to increase rigidity of the frame. The composite body assembly includes a front body section and a rear body section. The front body section includes at least two molded panels connected together so as to form a clam shell assembly, the molded panels each being formed of a fiber-reinforced polymer. The rear body section is formed of a molded fiber-reinforced polymer. In another aspect, the present invention is a utility vehicle comprising the above-described elements of the golf car.

In a further aspect, the present invention is a golf car comprising a high-strength molded composite body assembly formed from at least one molded fiber-reinforced polymer panel and having a periphery. A plurality of wheels support the body for movement along the ground. Further, at least one decorative body panel is connected with the composite body assembly. The decorative body panel is recessed inwardly relative to the periphery of the composite body assembly such that the composite body assembly extends outwardly of the decorative body panel to prevent impact with the panel.

In yet another aspect, the present invention is a method for manufacturing a vehicle comprising the steps of: providing a frame, connecting two molded fiber-reinforced polymer panels to form a clam shell assembly, mounting the clam shell assembly to a front portion of the frame, and mounting a rear body section to a rear portion of the frame. The rear composite body is formed from fiber-reinforced polymer and the clam shell assembly, the rear body section and the frame forming a substantially rigid high-strength frame and body assembly.

In an even further aspect, the present invention is also a golf car comprising a frame and a composite body assembly mounted to the frame and configured to increase rigidity of the frame. The body assembly includes a front body section and a rear body section. The front body section includes upper and lower panels connected together so as to form a generally box-like frame. Further, the rear body section includes a shell having an open lower end and at least partially bounding an interior chamber.

BRIEF DESCRIPTION OF THE DRAWINGS

The present invention is further described with reference to the accompanying drawings, which show an exemplary embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numeral indicate like parts.

DETAILED DESCRIPTION

Figure 1:
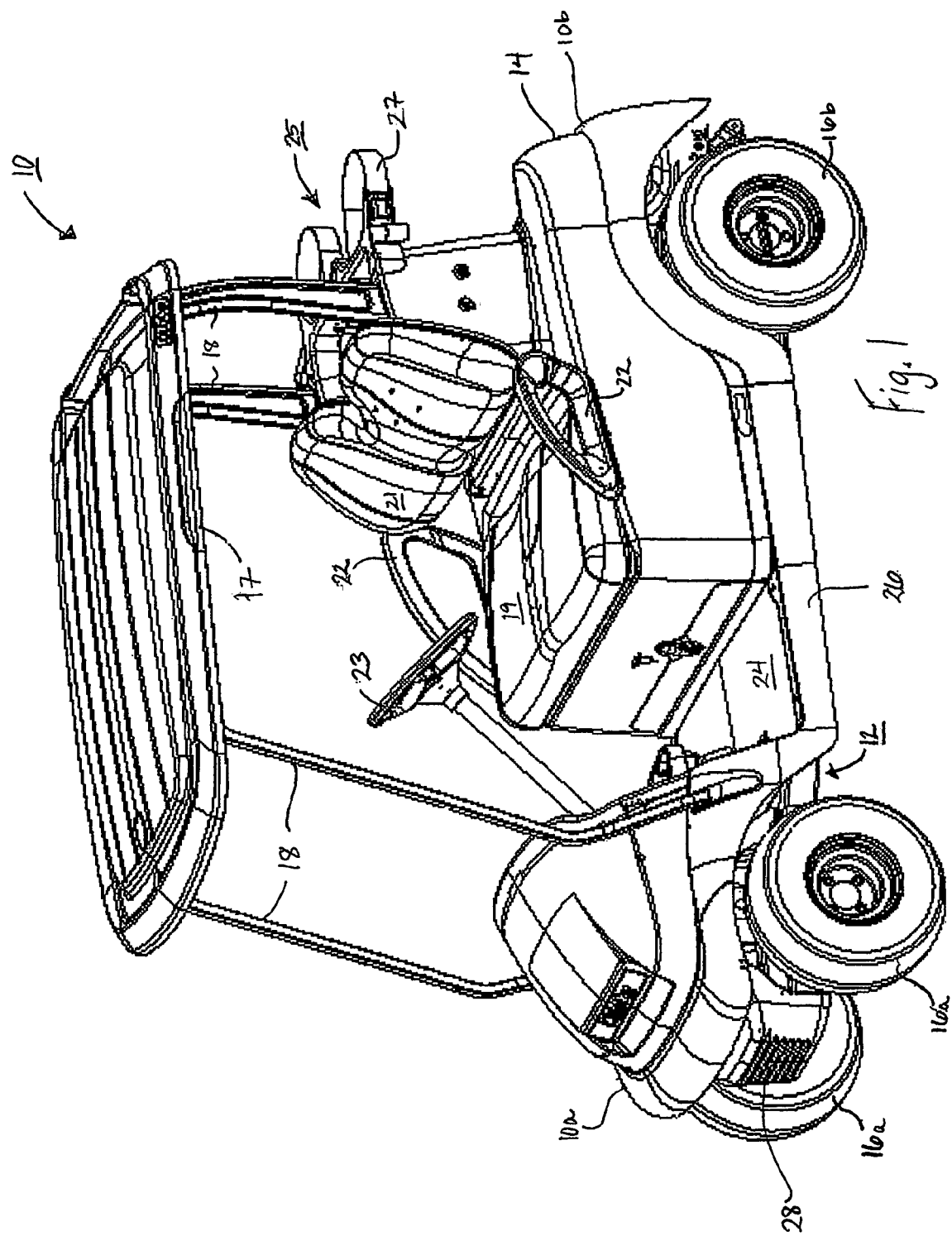
FIG. 1 is a perspective view of a golf car or utility vehicle embodying the invention.

Referring now to the drawings in detail, wherein like numbers are used to indicate like elements throughout, there is shown in FIGS. 1-17 a presently preferred embodiment of a vehicle 10, preferably a golf car 10 or a utility vehicle 10. The vehicle 10 includes a frame assembly or frame 12 (FIG. 2), a body 14, front wheels 16*a* and rear wheels 16*b*. The vehicle 10 preferably further includes a canopy 17, canopy supports 18, a seat 19, a seatback 21, armrests 22, a steering wheel 23, a floorboard panel 24, side panels 26, a structural accessory mount (SAM) 25 including golf bag support ties 27, and a front bumper 28.

Figure 2:
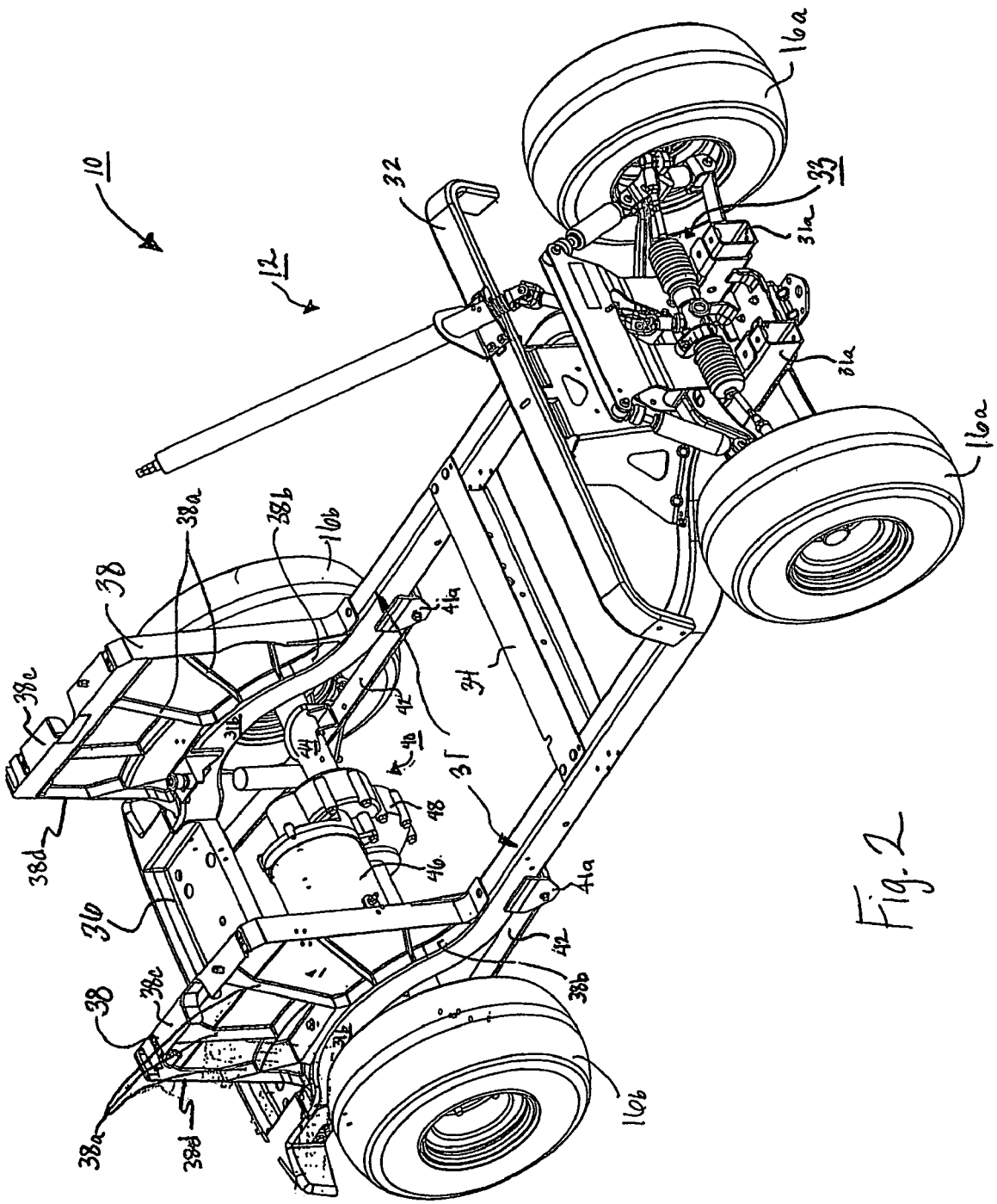
FIG. 2 is a perspective view of the golf car shown in FIG. 1 showing the frame assembly including a frame and rear body supports.

The frame assembly or frame 12, best shown in FIG. 2, provides support and structural stability to the vehicle 10. The frame 12 also provides impact resistance to certain areas of the vehicle 10, as discussed below. The frame 12, as shown in FIG. 2, includes two includes two longitudinally-extending, laterally spaced-apart rails 31 and at least one crossbeam 34 extending between and connecting the two rails 31. Preferably, the frame 12 also includes a dashboard support bar 32 connected with the rails 31, a rear frame structure 36 and rear body supports 38.

Figure 3:
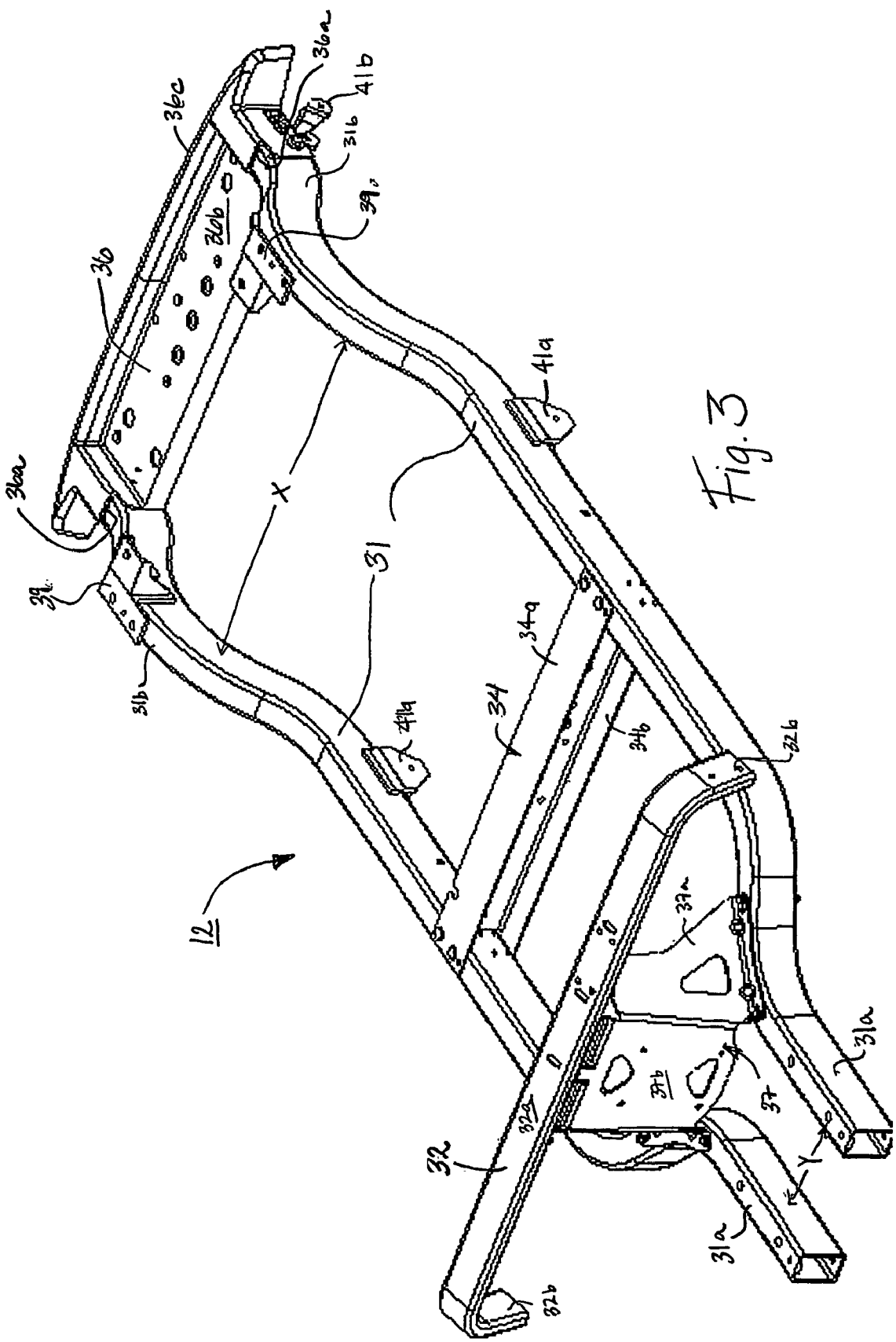
FIG. 3 is a perspective view of the golf car frame shown in FIG. 2.

The two elongated frame rails 31, best shown in FIG. 3, extend generally longitudinally with respect to the vehicle 10 and are spaced apart a transverse distance X such that each frame rail 31 extends along and supports outer side portions of the vehicle 10. The frame rails 31 curve inwardly toward the front 10a of the vehicle 10, thereby decreasing the distance between the two frame rails 31 at the front of the vehicle to a transverse distance Y and providing space outwardly of the forward portions of the frame rails for the front wheels 16a (FIG. 2). The forward projecting ends 31a of the frame rails 31 provide support for a steering and suspension assembly 33 (FIG. 2). The steering and suspension assembly 33 is a unitary modular assembly mounted to the forward projecting ends 31a of the frame rails 31, and the front wheels 16a are then mounted to the steering and suspension assembly 33. Rearward projecting ends 31b of the frame rails 31 are spaced the transverse distance X apart and are upwardly curved to provide space for the rear wheels 16b (FIG. 2). As best shown in FIG. 3, a pair of support brackets 39 and two pairs of mounting brackets 41a, 41b are attached (e.g., welded, bolted, etc.) to rear portions of the frame rails 31 to provide attachment surfaces and/or support for other vehicle components. More specifically, the support brackets 39 are laterally spaced-apart and are each fixed to an upper curved portion of the rear projecting end 31b of a separate one of the two frame rails 31. The support brackets 39 each provide generally flat attachment surface for securing one of the two rear body supports 38 to the frame 12. Further, a first pair of mounting brackets 41a each extend downwardly a central portion of a separate one of the frame rails 31 and a pair of rear mounting brackets 41b extend downwardly from the rear ends 31b of the frame rails 31. The mounting brackets 41a, 41b are configured to connect a pair of leaf springs 42 to the frame 12, as described below.

A support structure 37 (FIG. 3) for providing structural support to the dashboard support bar 32 is fixedly attached to the inwardly curved portions of the forward projecting ends 31a of the frame rails 31. The support structure 37 includes two generally triangular side wall sections 37a that are bolted or otherwise fixed to the inwardly curved portions of the frame rails 31 and a generally rectangular central wall section 37b that spans the transverse distance Y between the forward projecting ends 31a to centrally join inward facing edges of the triangular plates 37a. The support structure 37 primarily functions both to provide structural support to the dashboard support bar 32, and thus also to the steering column 70 connected thereto as discussed below, and to join together the forward projecting ends 31a of the frame rails 31. Preferably, the support structure 37 is of one-piece construction, with the three wall sections 37a and 37b being integrally formed, but may alternatively be formed of separate pieces connected together by any appropriate means (e.g., welding, rivets, etc.).

The dashboard support bar 32, best shown in FIG. 3, is disposed a vertical distance above the frame rails 31, supported by the support structure 37. The dashboard support bar 32 is bolted or otherwise fixed to the support structure 37. The dashboard support bar 32 is generally U-shaped with a substantially horizontal straight portion 32a extending transversely from one side of the vehicle 10 to the other side and two curved portions 32b extending downwardly relative to the straight portion 32a As shown in FIG. 3, the curved portions 32b are curved substantially perpendicularly relative to the straight portion 32a. Preferably, the dashboard support bar 32 is formed from a tubular bar, but may be formed of a solid bar or any other structural element.

The crossbeam 34, as best illustrated in FIG. 3, is connected with each of the frame rails 31 by any appropriate means (e.g., rivets, bolts, weldment material, etc.). The crossbeam 34 is positioned substantially horizontally, is generally shaped like an I-beam and extends substantially perpendicularly to the frame rails 31. The crossbeam 34 provides support to a central portion of the vehicle 10 and serves to join a central portion of each frame rail 31 to a corresponding portion of the other rail 31. The crossbeam 34 extends the entire transverse distance X between the central portion of the frame rails 31. The crossbeam 34 includes upper and lower plate sections 34a, 34b, respectively, that each have opposing ends which extend transversely over and are attached to an upper and lower surfaces of the frame rails 31, respectively, so as to connect the crossbeam 34 to the rails 31. The crossbeam upper plate section 34a also functions as a locater or guide to assist in correctly positioning sections of the vehicle body 14 onto the frame 12, as described below.

The rear frame structure 36, as best illustrated FIG. 3, is attached to the rearward projecting ends 31b of the frame rails 31 by any appropriate means (e.g., by threaded fasteners, welding, etc.). The rear frame structure 36 has forward facing apertures 36a that mate with the rearward projecting ends 31b of the frame rails 31. The rear frame structure 36 has a substantially rectangular recessed portion 36b integrally formed with a rear curved portion 36c. The rear frame structure 36, particularly the rectangular recessed portion 36b, serves as an attachment surface for various vehicle components and sections of the vehicle body 14. The rear frame structure 36 also provides impact resistance to the vehicle 10 in the incidence of a rear collision. The rear curved portion 36c includes a rearward-facing flat surface that extends a transverse distance beyond each side of the recessed rectangular portion 36a, thereby providing additional protection from impact.

The rearward extending ends 31b of the frame rails 31 support a rear suspension assembly 40 which includes leaf springs 42, as shown in FIG. 2. The two pairs of mounting brackets 41a, 41b provide attachment surfaces for the leaf springs 42, which extend generally longitudinally with respect to the vehicle 10 from the front brackets 41a located centrally on the frame rails 31 to the rear brackets 41b located proximal the rear ends of the rails 31b. The leaf springs 42 support a rear axle 44, and the rear axle 44 supports the rear wheels 16b, a motor 46 and associated motor components. As such, the motor 46 and drive components, which may include an electric motor 47a having a gearbox 47b (see FIG. 2) or an internal combustion engine 48a with a transmission 48b (see FIG. 5), are located substantially centrally between the rearward projecting ends 31b of the frame rails 31.

The rear body supports 38, as best shown in FIG. 2, are secured to the rearward projecting ends 31b of the frame rails 31. The rear body supports 38 extend longitudinally along an upwardly curved portion of the frame rails 31 and vertically above the frame rails 31 to provide additional height to the frame 12. The rear body supports 38 each include generally parallel ribs 38a extending from a curved surface 38b adjacent the curved portion of the frame rails 31 to a substantially flat and horizontal upper surface 38c disposed a vertical distance above the curved surface 38b and the frame rails 31. The upper horizontal surface 38c and a rear, generally vertical surface 38d each provide an attachment surface for connecting other vehicle components and portions of the vehicle body 14, as described below.

The dashboard support bar 32, the support structure 37, the crossbeam 34, the rear frame structure 36, the rear body supports 38, the support brackets 39 and the mounting brackets 41a, 41b are all connected with the frame rails 31, as described above, in any conventional manner, such as by weldment material or welding, threaded fasteners such as bolts or screws, by rivets, and/or by any other appropriate means. The frame rails 31, dashboard support bar 32 and crossbeam 34 may be extruded or formed from cut lengths of commercially available tubes or bars, and may be formed of aluminum, steel and/or another high strength metal or polymer. The rear frame structure 36, the support structure 37, the rear body supports 38 and the support brackets 39, and the mounting brackets 41a, 41b may each be fabricated of a molded polymeric material or of a cast, stamped, forged, and/or machined metallic material. In a preferred form of the invention, the frame rails 31 and crossbeam 34 are formed of extruded aluminum, the dashboard support bar 32 formed of extruded steel, the support structure 37 is formed of steel, and the rear frame structure 36 and rear body supports 38 are formed of a compression-molded, fiber-reinforced polymer. Specifically, the rear frame structure 36 is preferably formed of 30% glass fiber reinforced polypropylene homopolymer, and the rear body supports 38 are preferably formed of a 30% glass filled, chemically coupled impact polypropylene copolymer, POLFORT® FPP 1606 (available from A. Schulman, Inc.).

A composite body assembly 58 (FIGS. 4 and 6) is mounted to the frame 12, and when connected with the frame 12, provides a high strength frame and body assembly 35. The composite body assembly 58 is configured to increase the rigidity of the frame 12 so as to add strength and rigidity to the vehicle 10. In addition, the composite body assembly 58 and provides support and attachment surfaces for many of the vehicle components, including a battery or fuel supply bucket 66, support braces 68 for the SAM 25, and other components as discussed below. In a preferred form of the present invention, the composite body assembly 58 is formed of a 30% glass fiber reinforced polypropylene copolymer.

Figure 4:
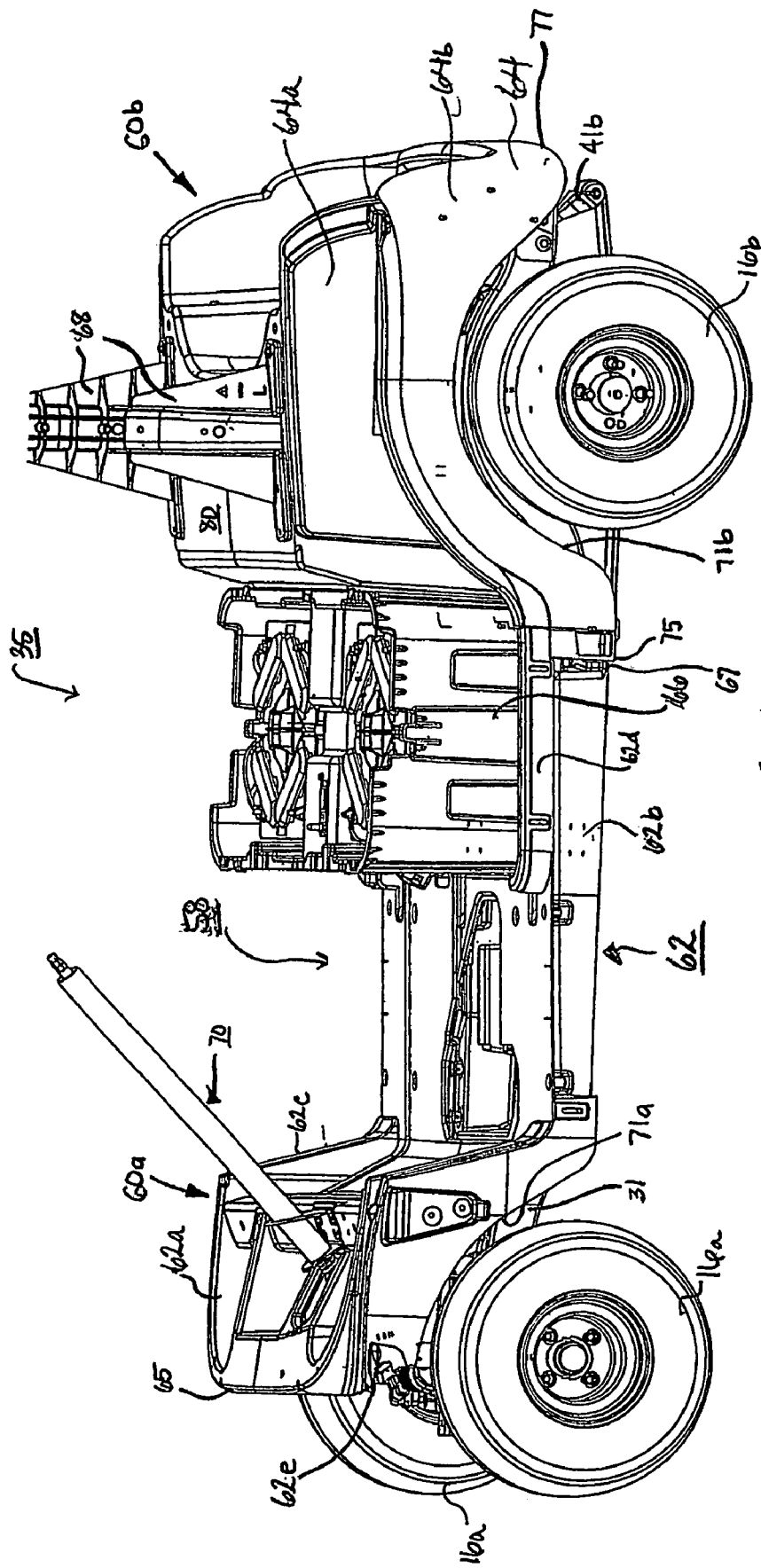
FIG. 4 is a side perspective view of the golf car shown in FIG. 1 illustrating a composite body assembly and frame assembly.
Figure 5:
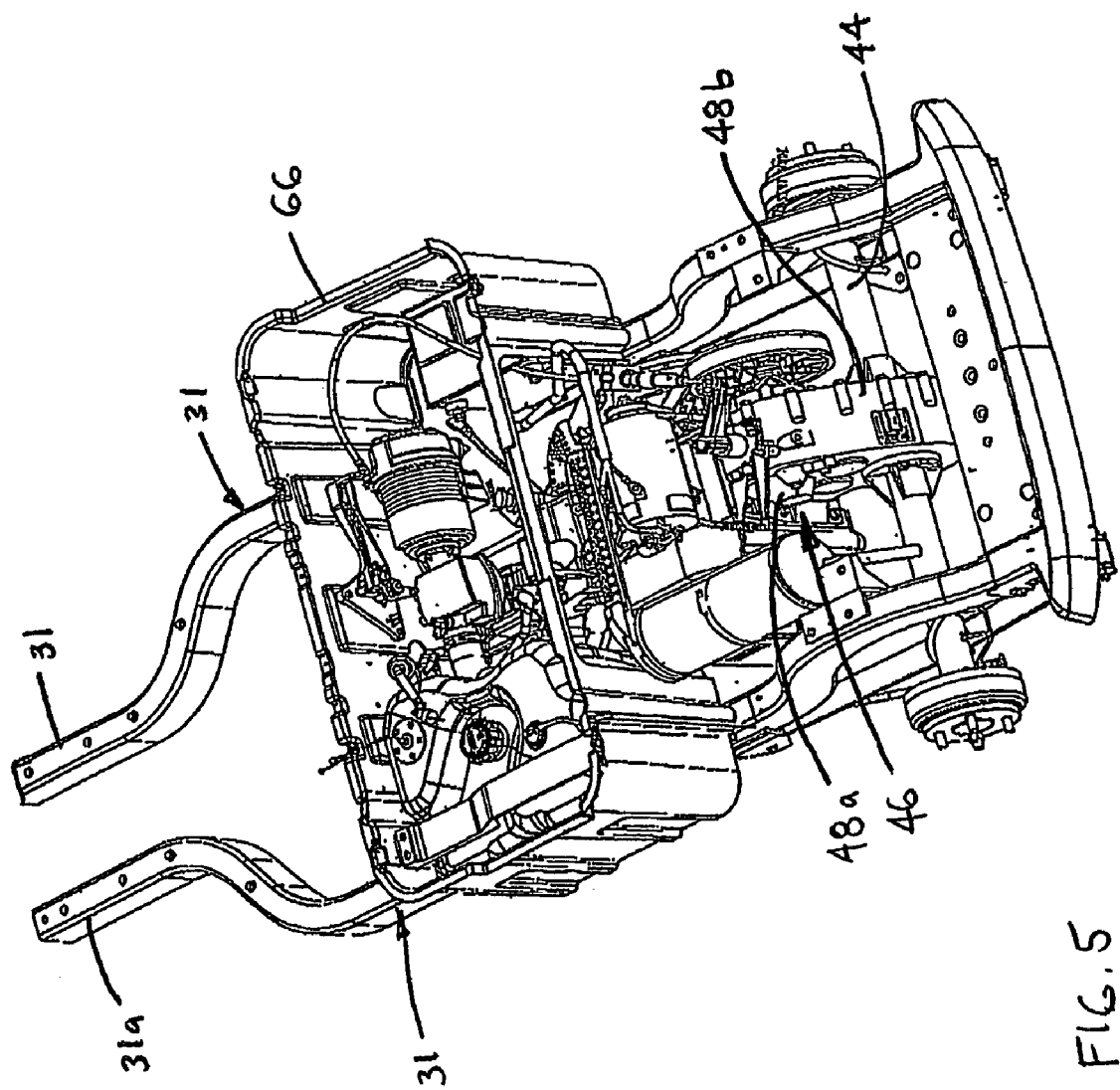
FIG. 5 is rear perspective view of the golf car frame, showing an internal combustion engine and related components connected with the frame.
Figure 6:
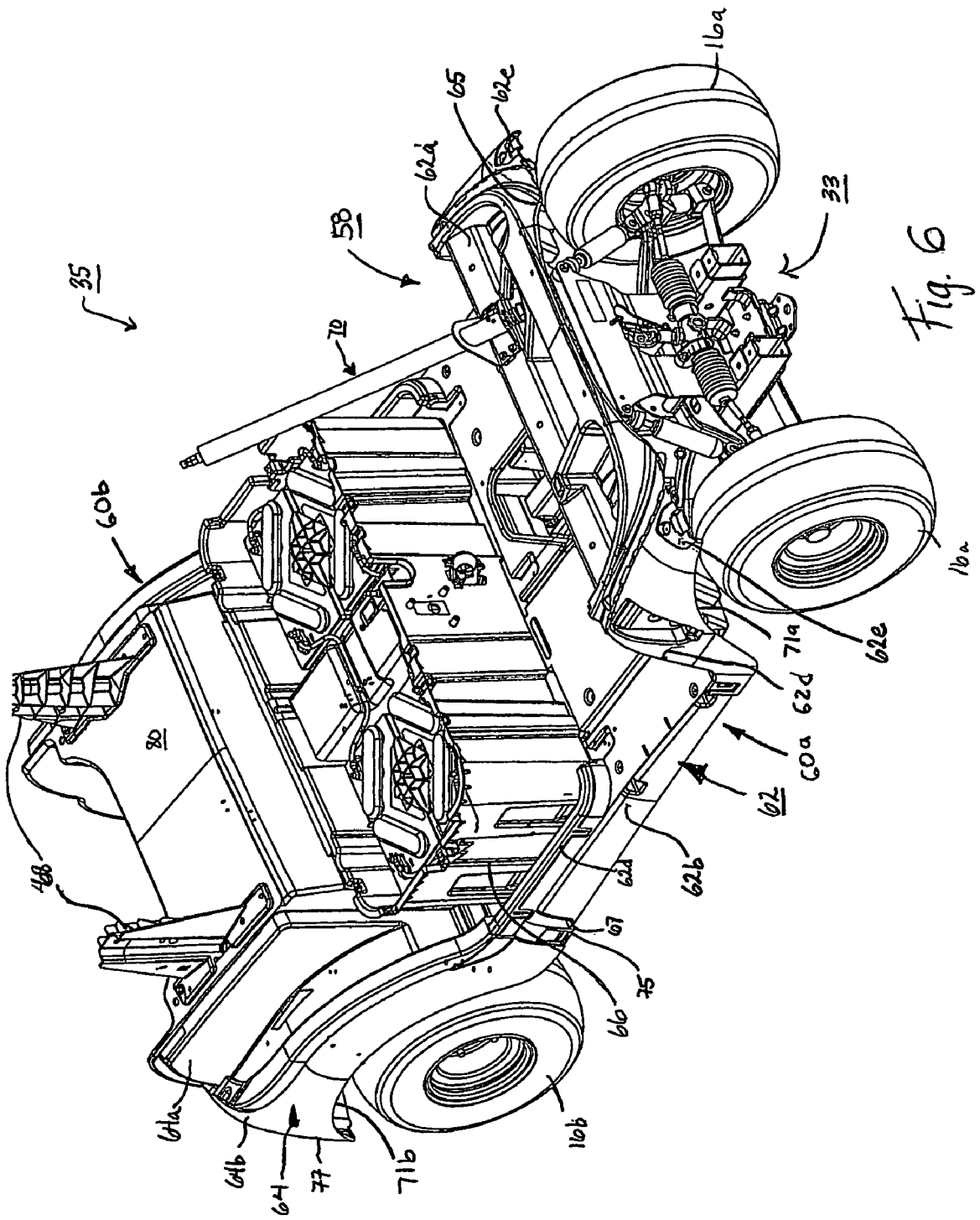
FIG. 6 is a front perspective view of the golf car composite body assembly.

As shown in FIGS. 4 and 6, the composite body assembly 58 includes a front body section 60a, preferably formed as a clam shell assembly 62 (as described in greater detail below), and a rear body section 60b that is preferably formed as a one-piece housing or shell 64 (discussed below). The front clam shell assembly 62 and the rear body shell 64 may be independently attachable to the frame 12 and need not be connected together. The clam shell assembly 62 provides support to front and central portions of the vehicle 10. The front clam shell assembly 62 is a generally box-like frame that curves upwardly toward the front of the vehicle 10, as best shown in FIG. 4, to provide a pair of laterally-spaced front wheel wells 71a for the front wheels 16a. The clam shell assembly 62 extends generally longitudinally rearwardly from a front edge 65, spaced vertically above the front axle and steering and suspension assembly 33 when connected with the frame 12, to a rear edge 67 that is generally proximal to the support brackets 41a (FIG. 3) on the frame rails 31, and thus located forwardly of the rear wheels 16b. Further, the clam shell assembly 62 provides a dashboard 62a and a floorboard support 62b of the vehicle 10.

More specifically, the dashboard 62a is integrally formed with the floorboard support 62b via a substantially vertical portion 62c of the clam shell assembly 62, and is disposed a vertical distance above the floorboard 62b following the structure set forth by the frame 12. Upper surfaces of both the dashboard 62a and the floorboard support 62b are substantially horizontal and extend transversely on each side of the vehicle 10 beyond the frame 12. The dashboard portion 62a of the clam shell assembly 62 is attached to the dashboard support bar 32, and the floorboard support portion 62b is supported by the crossbeam 34 and is attached to the frame rails 31. The dashboard 62a further includes slots and/or surfaces 62e for attaching a brow 102 to the front of the vehicle 10 (FIGS. 11-15 and 17), which is described in detail below. The floorboard support 62b includes a raised edge 62d that extends vertically upwardly relative to the floorboard support 62b. The raised edge 62d is curved to match a peripheral shape of the battery or fuel supply bucket 66 to define a secure location for the battery or fuel supply bucket 66. As shown in FIGS. 4 and 6, the clam shell assembly 62 is preferably attached to the frame rails 31 and the dash support bar 32.

As mentioned above, the rear body section 60b includes a generally shell-like body or shell 64 having an open lower end 57 and at least partially bounding an interior chamber 59. The rear body shell 64 that extends longitudinally between a front edge 75 and a rear edge 77, the front edge being located adjacent the clam shell rear edge 67 and the rear edge 77 being located behind the rear wheels 16b when the body section is disposed on the frame 12. The rear body shell 64 curves upwardly, following the structure of the frame rails 31, to provide a pair of laterally-spaced wheel wells 71b for the rear wheels 16b. The rear body shell 64 has an upper portion 64a and a lower portion 64b, each having a periphery. The periphery of the upper portion 64a is recessed inwardly relative to that of the lower portion 64b. As shown in FIGS. 4 and 6, the rear body shell 64 is bolted or otherwise fixed to the rear body supports 38 and the rear frame structure 36. The upper portion 64a further defines an upper, substantially horizontal attachment surface 80 for attaching the SAM support braces 68 to the vehicle 10.

Figure 7:
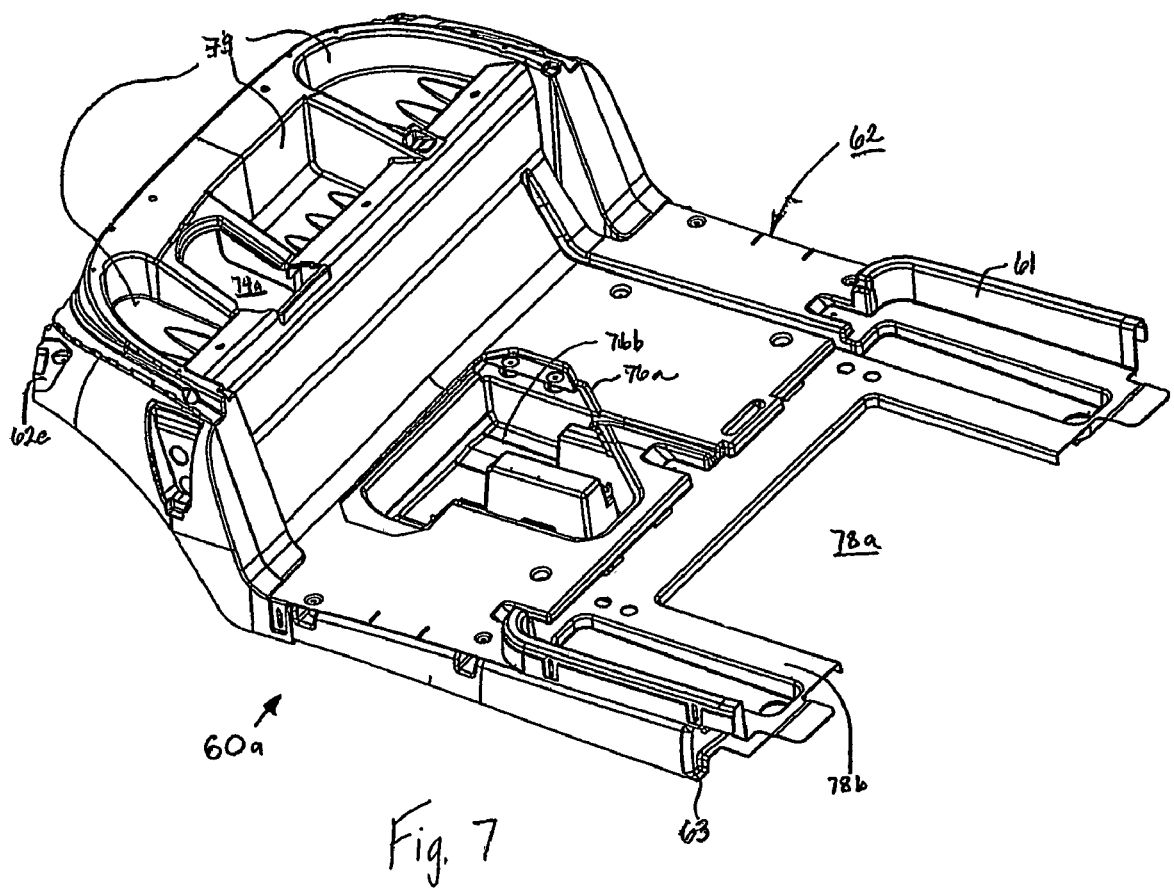
FIG. 7 is a perspective view of two molded panels joined together to form a clam shell assembly.
Figure 8:
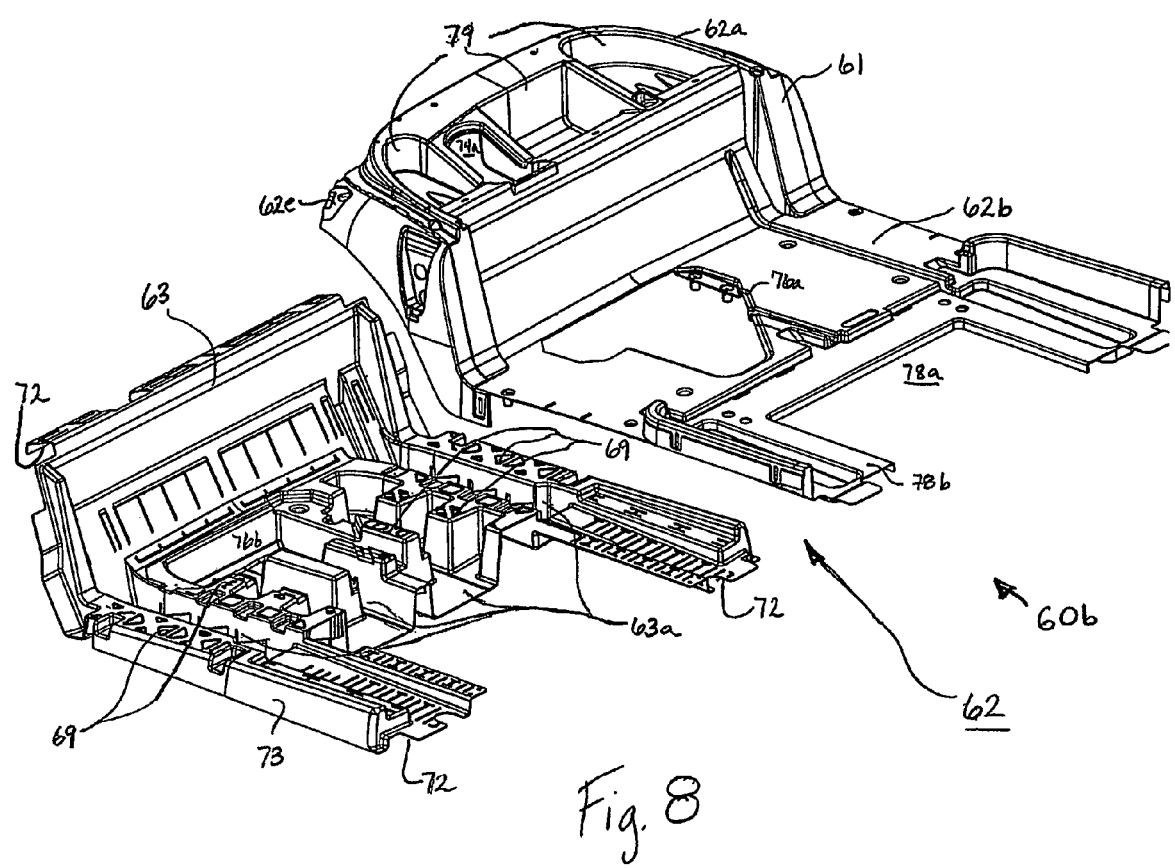
FIG. 8 is an exploded view of the clam shell assembly illustrated in FIG. 7.

FIGS. 7 and 8 illustrate the clam shell assembly 62 in greater detail. As shown in FIGS. 7 and 8, the clam shell assembly 62 includes an upper panel 61 and a lower panel 63. FIG. 6 illustrates the clam shell assembly 62 with the upper and lower panels 61 and 63 joined together. In a preferred form of the invention, the upper and lower panels 61 and 63 are vibrationally welded together to form the clam shell assembly 62. As shown in FIG. 7, the clam shell assembly 62 provides clearance openings and attachment surfaces for several vehicle components, including a first clearance aperture 74a for the steering column assembly 70, a second aperture 76a and attachment surface 76b for a modular pedal group assembly (not shown) and a third aperture 78a and attachment surface 78b for the battery or fuel supply bucket 66. The dashboard portion 62a of the clam shell assembly 62 is primarily formed from the upper panel 61. The dashboard portion 62a includes upwardly-opening molded storage compartments 79 for passenger accessories and personal items, including storage space for wallets, purses, gym bags, car keys, and the like. The storage compartments 79 are integrally molded into the dashboard portion 62a of the clam shell assembly 62, and more particularly, are molded into a front, upper portion of the upper panel 61.

FIG. 8 shows an exploded view of the front clam shell assembly 62. As illustrated in FIG. 8, two panels 61, 63 formed of fiber-reinforced polymer are molded (e.g., compression molded) to form a series of longitudinally extending channels 63a with respect to the vehicle 10, such that when they are joined together, the joined panels 61, 63 form a plurality of longitudinal cavities between the panels 61, 63. The longitudinal cavities define open air spaces between the panels 61, 63, and such cavities provide strength and toughness to the clam shell assembly 62. The cavities are preferably filled with air, but the cavities may instead be filled with fluid or material to change the impact resistance, strength and toughness of the clam shell assembly 62. For example, the cavities may be filled with an impact absorbing or resilient material.

The lower panel 63 further includes a plurality of flat surfaces 69 that mate with opposed surfaces on the upper panel 61, as shown in FIG. 8. As mentioned above, the lower panel 63 includes a recessed portion with a support or attachment surface 76b for housing an accelerator pedal and/or a brake pedal, preferably a modular pedal group assembly including the pedals (not shown), such that the front body section 60a is configured to support the one or more pedals. The lower panel 63 further provides side supports 73 to the vehicle 10 to support and provide attachment surfaces for the side panels 26 (FIG. 1). The lower panel 63 also provides one or more attachment surfaces 72 for mounting the entire clam shell assembly 62 to the frame 12, and particularly, to the frame rails 31 and the dashboard support bar 32. Alternatively, the upper panel 61 may include one or more attachment surfaces for attaching the clam shell assembly 62 to the frame 12 in addition to or instead of the lower panel attachment surfaces 72.

Figure 9:
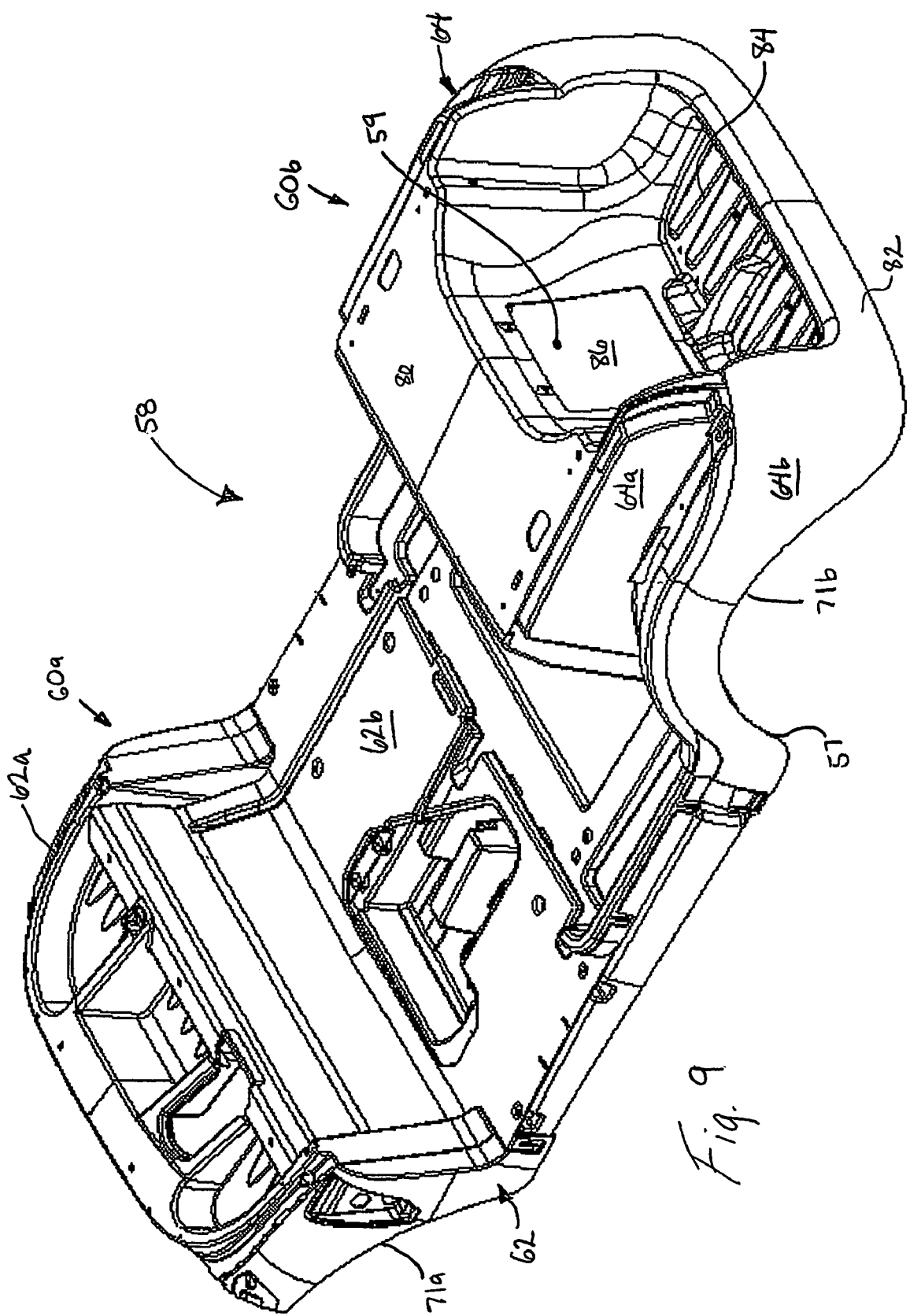
FIG. 9 is a rear perspective view of the composite body assembly.
Figure 10:
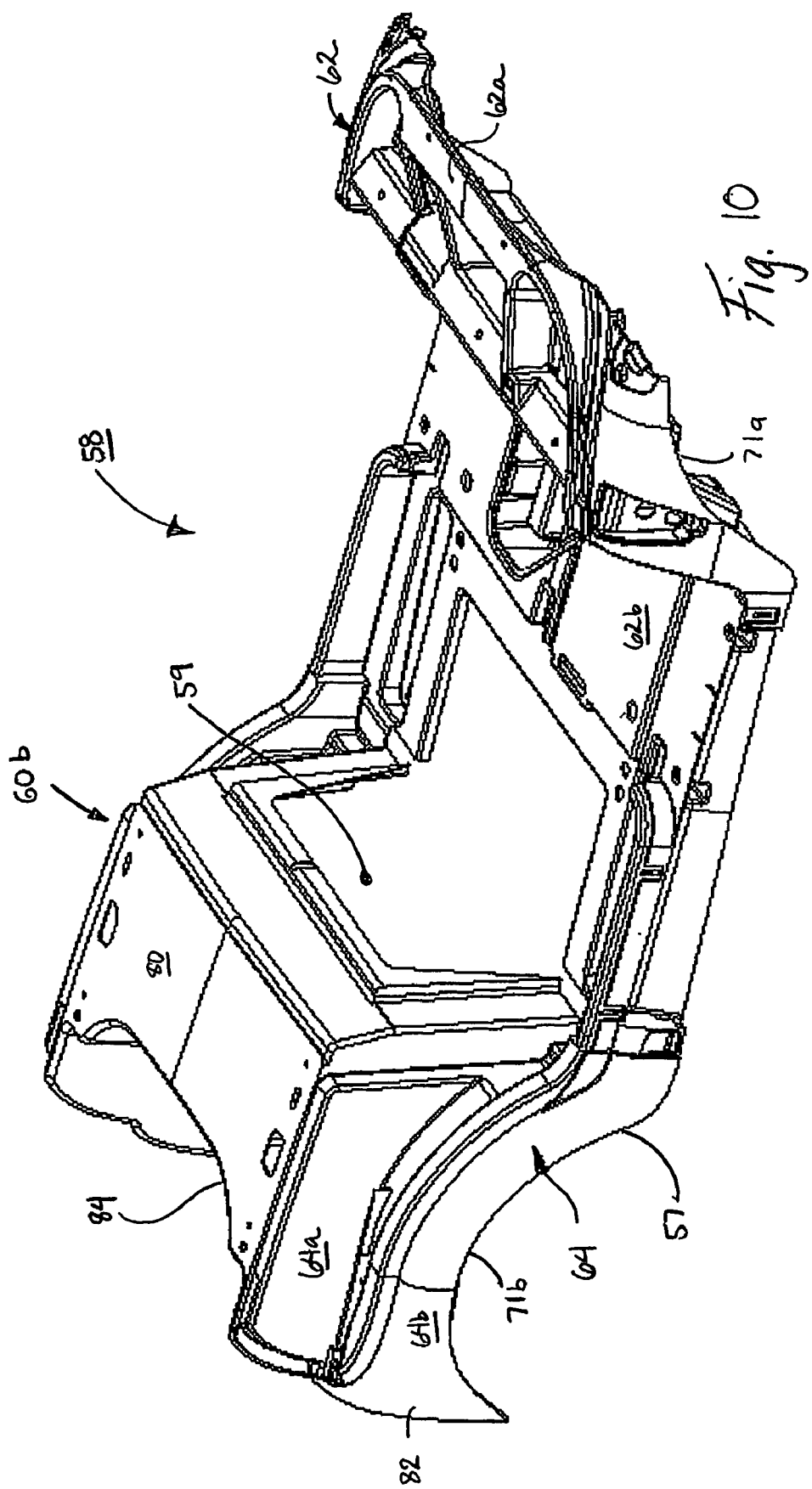
FIG. 10 is a front perspective view of the composite body assembly.

FIGS. 9 and 10 illustrate the rear body shell 64 disposed adjacent to the front clam shell assembly 62 so as to form the composite body assembly 58. As mentioned above, the front clam shell assembly 62 and rear body shell 64 are preferably not connected together prior to being mounted to the frame 12. The rear body shell 64 is preferably formed of one-piece construction, i.e., a single or unitary, integral piece. The illustrated embodiment shows the rear body shell 64 as a unitary compression-molded piece comprised of fiber-reinforced polymer. In a preferred form of the invention, the fiber-reinforced polymer is a fiberglass-reinforced polypropylene.

When the rear body section 60b is disposed on the frame 12, the shell 64 is positioned such that the rear axle 44, the motor 46 and associated drive system components, i.e., either electric motor 47a and gearbox 47b or IC engine 48a and transmission 48b, are at least partially disposed within the interior chamber 59 of the rear body section 60b. The rear body shell 64 also provides an attachment surface 80 for the support braces 68 and SAM 25. The rear body shell 64 may also provide a rear bumper 82 positioned to absorb impact, as shown in FIG. 9. Further, the rear body shell 64, as illustrated in FIG. 10, also includes a golf bag support or well 84, which is an integral recessed portion of the rear body shell 64, and has a base and one or more walls. The golf bag support or well 84 may be used for housing, supporting and transporting golf bags. The rear body shell 64 therefore has high strength and structural stability for supporting the weight of two or more golf bags and high impact resistance to serve as the rear bumper 82 in the event of a rear collision. As illustrated in FIG. 9, the rear body shell 64 also includes an access opening 86 positioned to facilitate access to the motor 46 and/or drive components 48 (FIGS. 2 and 4) for maintenance and repair, and a removable panel 87 configured to obstruct (i.e., cover) the access opening 86 when disposed on the rear body section 60b.

Figure 11:
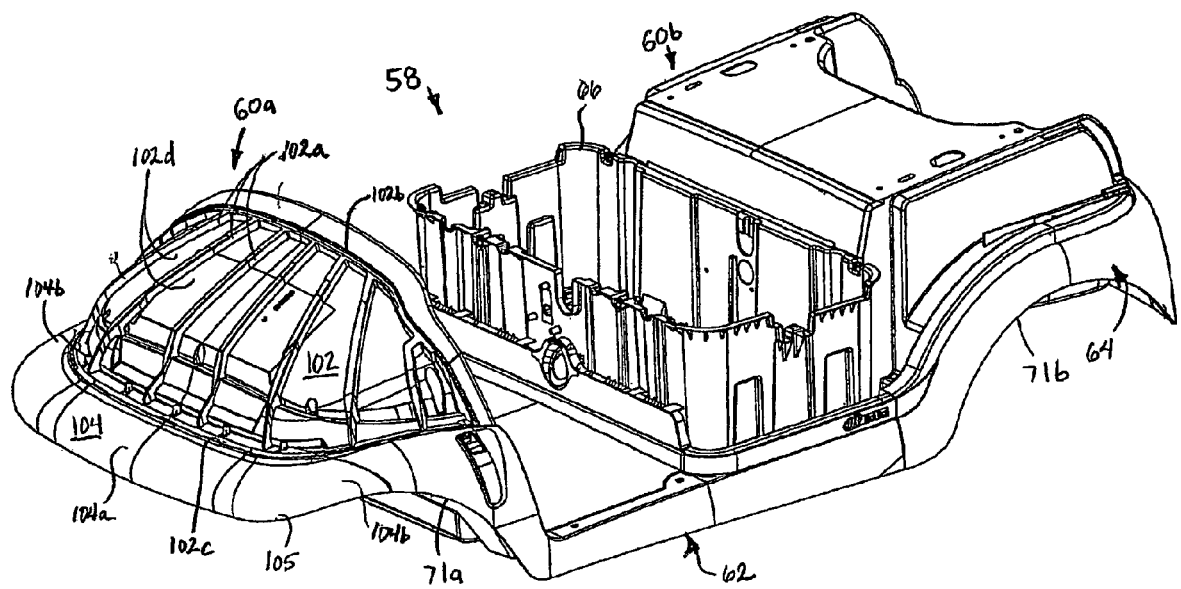
FIG. 11 is front perspective view of the composite body assembly, a brow and a fascia of the golf car.
Figure 12:
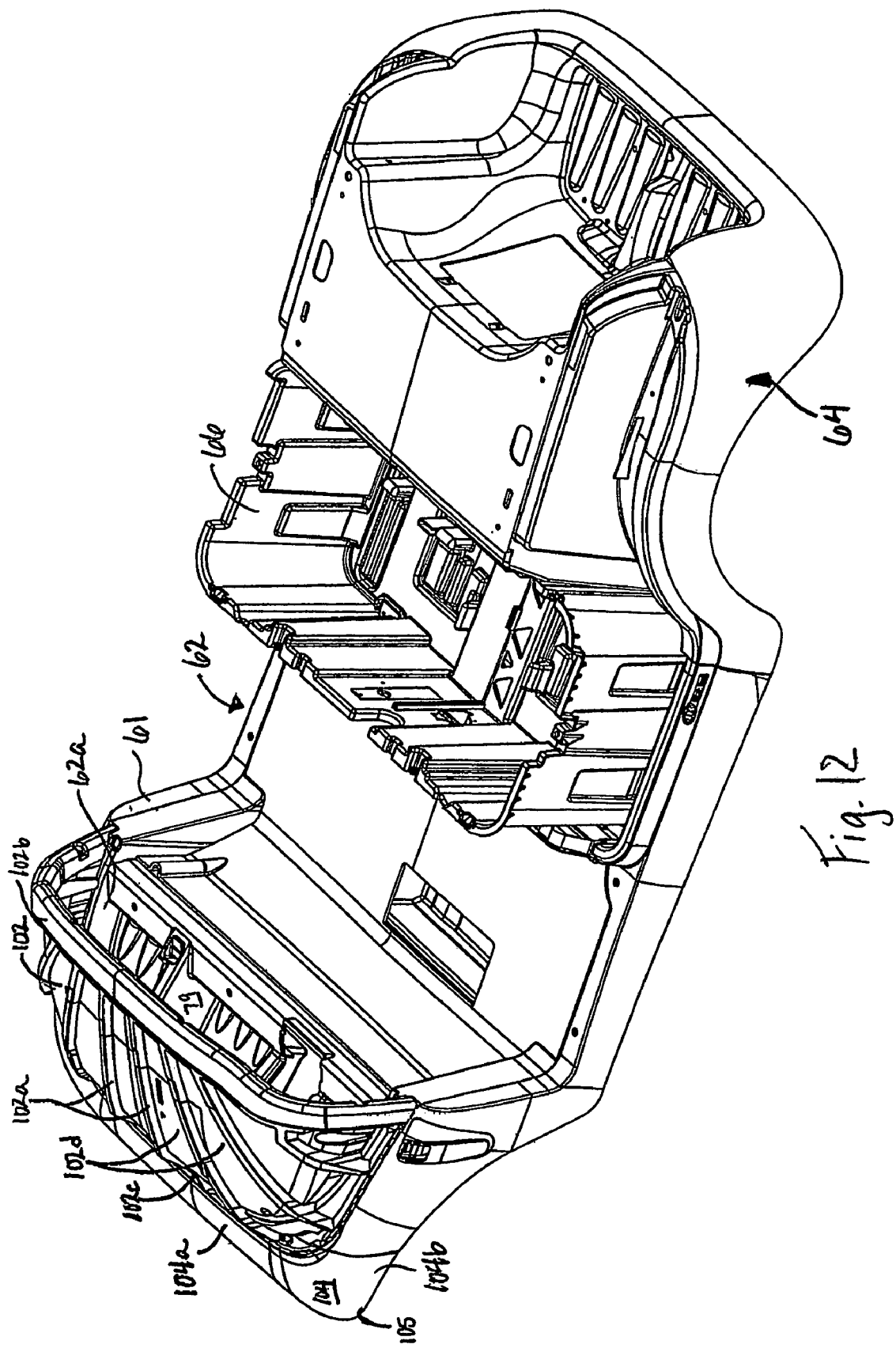
FIG. 12 is a rear perspective view of the composite body assembly, brow and fascia shown in FIG. 11.
Figure 13:
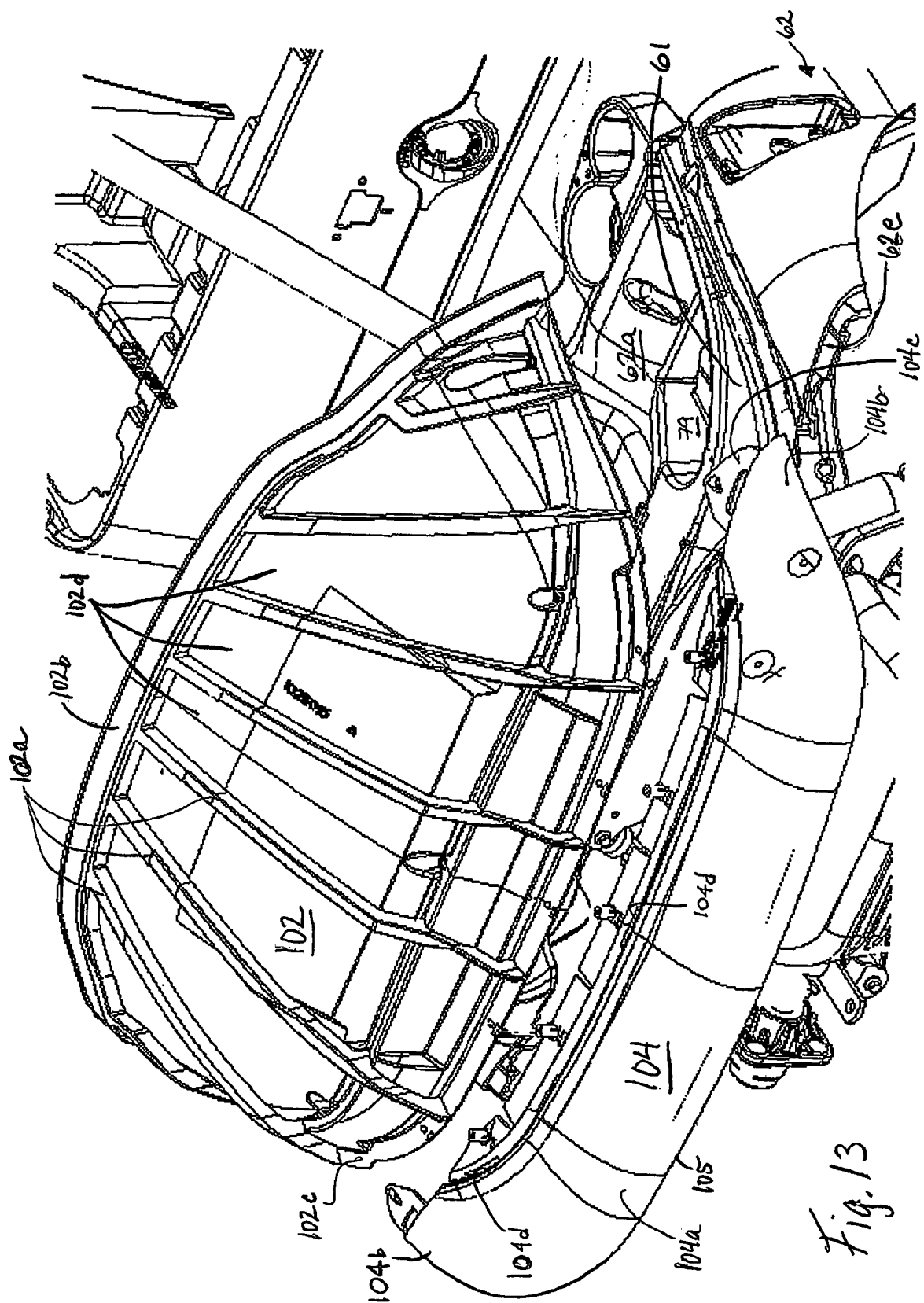
FIG. 13 is an exploded view of the composite body assembly, brow and fascia shown in FIGS. 11-12.

FIGS. 11, 12 and 13 illustrate a brow 102 and a fascia 104 bolted or otherwise fixedly mounted to a front portion of the vehicle 10. The brow 102 is preferably formed of an injection molded, fiber-reinforced, polymer and secured to the upper panel 61 of the clam shell assembly 62. In a preferred form of the invention, the brow 102 is constructed of a 20% $CaCO_3$-filled, UV stable polypropylene copolymer, POLYFORT® FPP 3708U (available from A. Schulman, Inc.). The brow 102 includes a plurality of spaced apart, substantially parallel ribs 102a that extend from an uppermost arch 102b to a lowermost arch 102c, the ribs 102a defining therebetween a series of channels 102d. A front decorative body panel 106 (FIGS. 14, 15 and 17) is formed to fit over the brow 102 to provide aesthetic appeal to the vehicle 10. The channels 102d define cavities formed between the front decorative body panel 106 and the brow 102. Similar to the cavities defined between the upper and lower panels 61, 63 of the clam shell assembly 62 described above, these cavities may be open air spaces or may alternatively be filled with fluid or material, such as a resilient, impact-absorbing material. The cavities therefore provide structural support to the front 10a of the vehicle 10.

As shown in FIGS. 11, 12 and 13, the fascia 104 is bolted or otherwise fixed to the brow 102 and extends forwardly from the brow 102. The fascia 104 has a curved shape with one relatively straight portion 104a and two curved portions 104b that extend rearward relative to the straight portion 104a and curve substantially perpendicularly to the straight portion 104a. The fascia resembles a typical vehicle bumper and extends transversely, spanning the width of the front of the vehicle 10. Referring particularly to FIG. 13, the fascia 104 includes a plurality of slots 104d engageable by tabs 106a of the body panel 106, as discussed below, and the curved portions 104b include tabs 104c that mate with the opposing slots 62e in the clam shell assembly 62. The fascia 104 has a periphery 105, and the front decorative body panel 106 (FIGS. 14, 15 and 17) is recessed inwardly from the periphery 105 so as to be protected by the fascia 104 from damage. However, the fascia 104 need not be constructed of a high impact resistant material because one or more additional bumpers, such as bumper 28 shown in FIG. 1, may be disposed beneath the fascia 104 and in front of the steering and suspension assembly 33 to offer additional protection to the vehicle 10 in the event of a head-on collision.

FIG. 13 shows a close-up of the assembly of the brow 102 to the dashboard 62a and assembly of the fascia 104 to the brow 102 and clam shell assembly 62. Specifically, the brow 102 and fascia 104 are attachable to the upper panel 61 of the clam shell assembly 62. As best shown in FIGS. 12 and 13, the brow 102 also serves as a covering and/or splash guard for the dashboard 62a, thereby providing coverage and protection for items stowed in the storage compartments 79.

Decorative body panels 106 and 108 are added to the vehicle 10 both to provide an aesthetically-pleasing exterior and to enclose certain vehicle components, as discussed below. The decorative body panels 106 and 108 are preferably each formed of a single, molded panel. In a preferred form of the invention, the decorative body panels 106 and 108 are constructed of super-gloss molding alloy from the SURLYN® REFLECTION series (e.g., SURSG201), available from DuPont Company.

Figure 14:
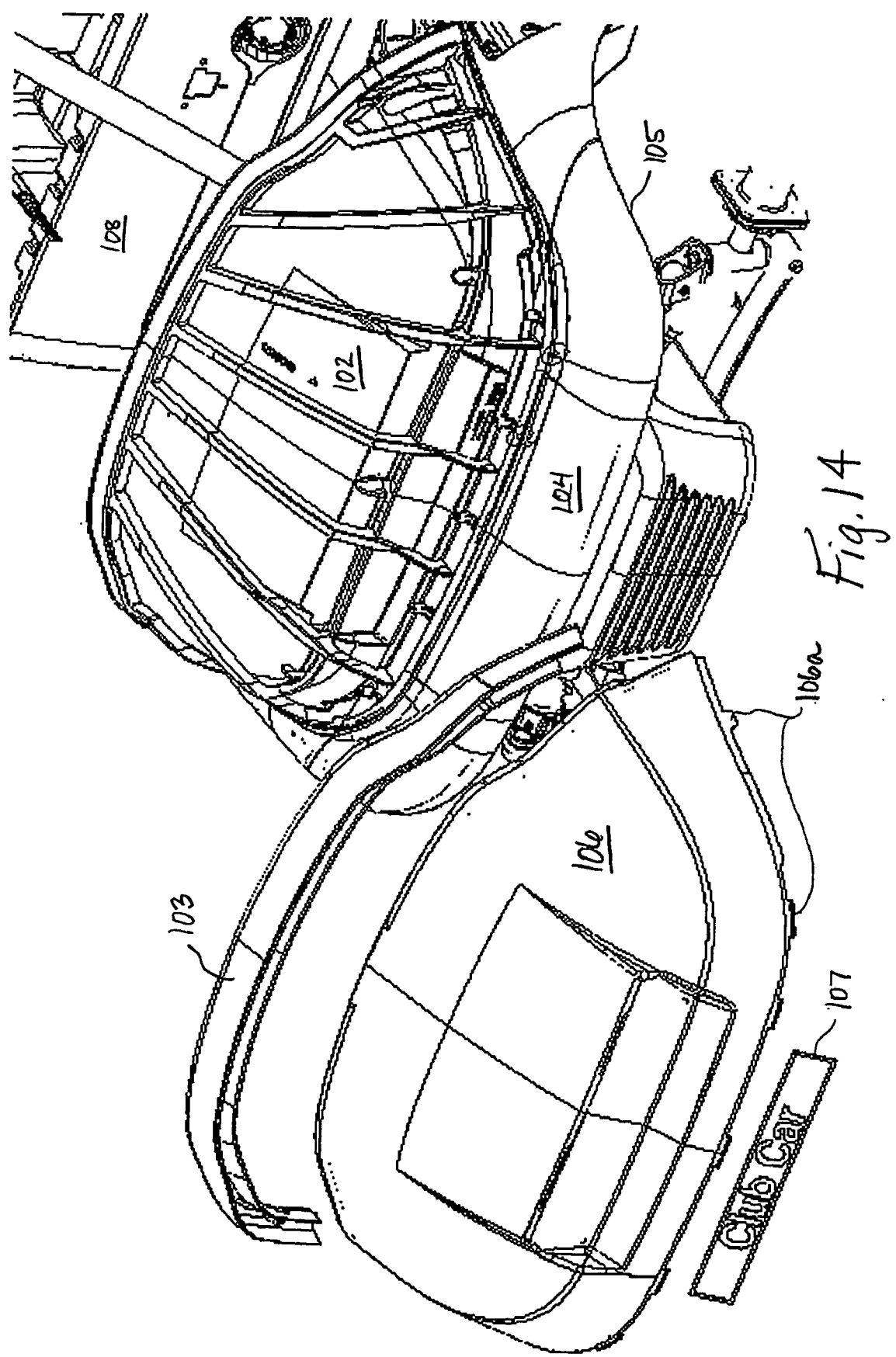
FIG. 14 is an exploded view of a front decorative body panel of the golf car.
Figure 15:
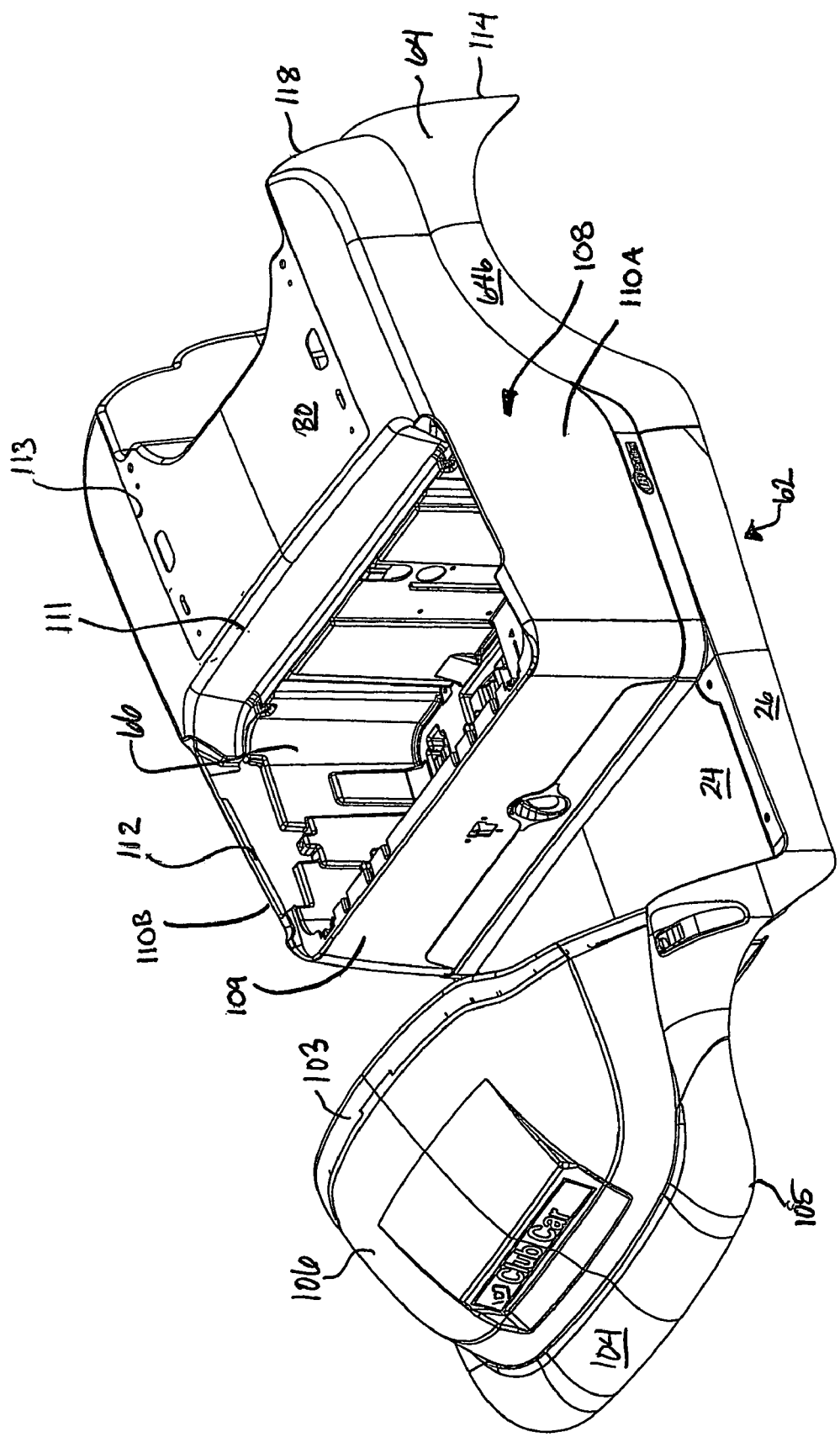
FIG. 15 is a perspective view of the composite body assembly and decorative body panels of the golf car shown in FIG. 1.
Figure 17:
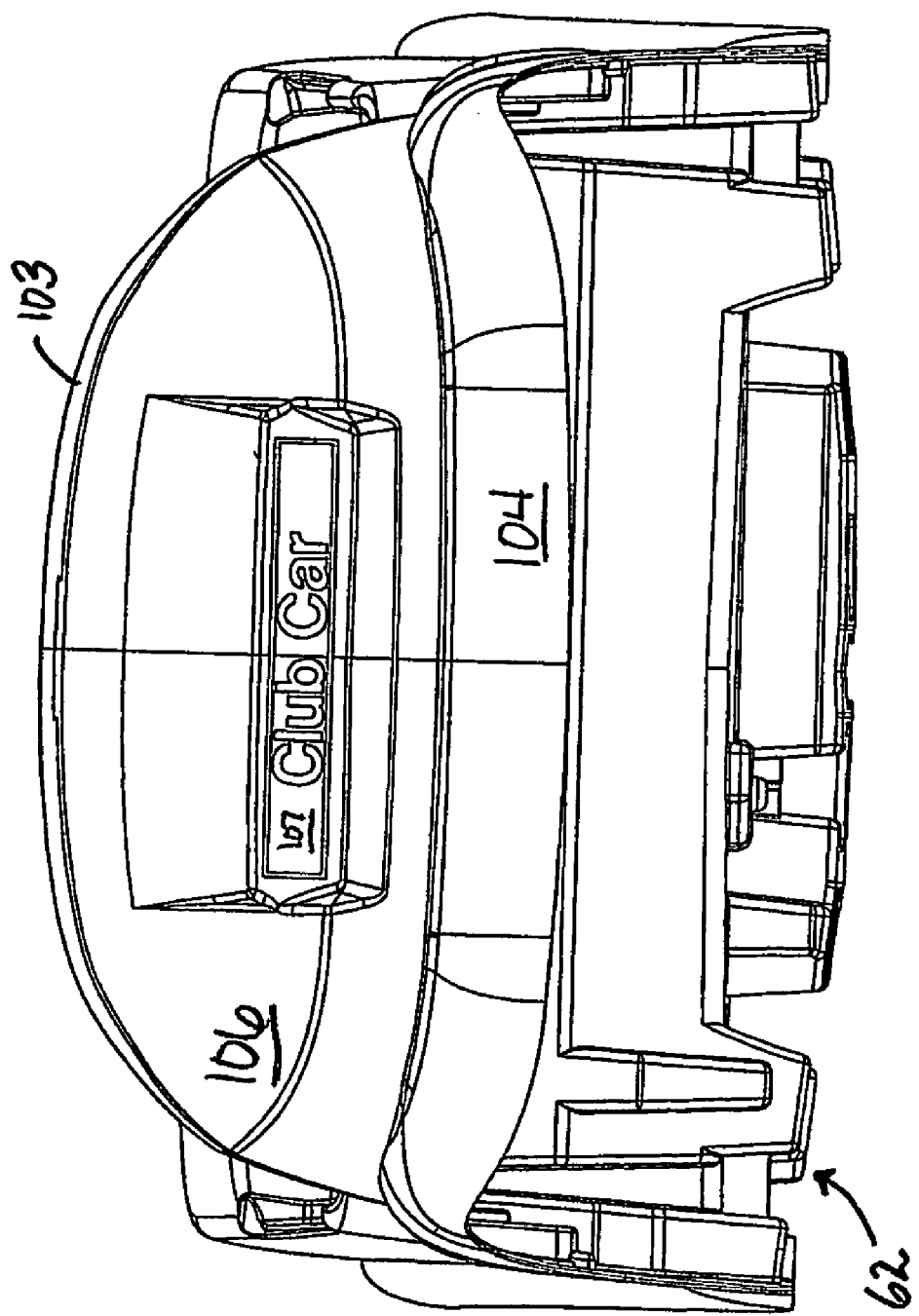
FIG. 17 is a front elevational view of the composite body assembly and front decorative body panel shown in FIG. 15.

As illustrated in FIGS. 14, 15 and 17, the front decorative body panel 106 is rounded to match and cover the underlying structure of the brow 102. The front decorative body panel may include a company logo or vehicle identifier 107, as shown in FIGS. 14, 15 and 17. FIG. 14 illustrates the assembly of the front decorative body panel 106 to the brow 102. The front decorative body panel 106 includes a plurality of spaced apart tabs 106a that extend downwardly from a bottom edge of the front decorative body panel 106. The tabs 106a are engageable with the slots 104d of the fascia 104 and slots 62f formed in the dashboard 62a of clam shell assembly 62. The front decorative body panel 106 is assembled by aligning and inserting the tabs 106a into corresponding slots 104d or 62f, and securing the front decorative body panel 106 to the brow 102 by bolting or otherwise securing an arch 103 over an upper edge of the front decorative body panel 106 to the brow 102 and/or clam shell assembly 62.

Figure 16:
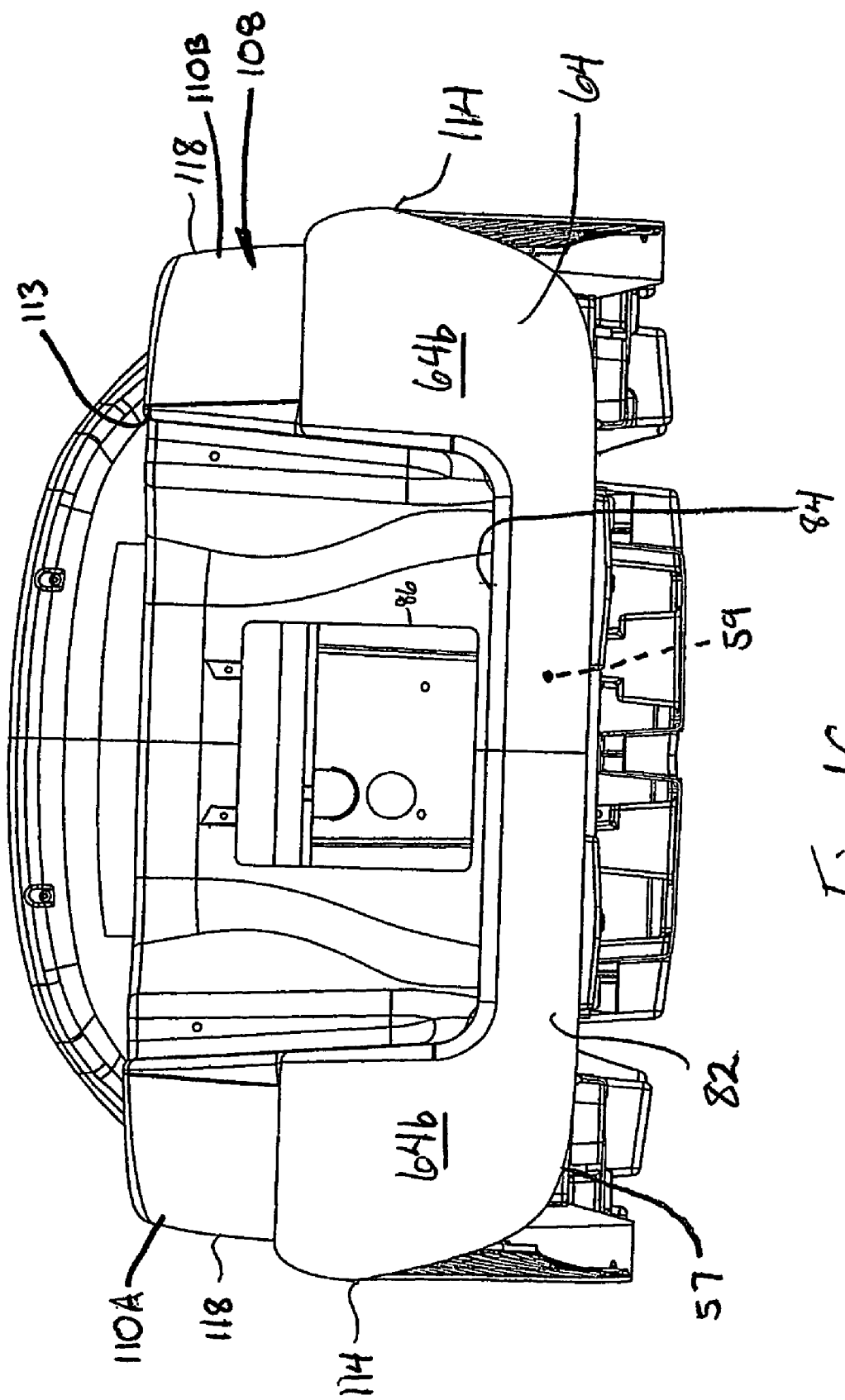
FIG. 16 is a rear elevational view of the composite body assembly and rear decorative body panel shown in FIG. 15.

The rear decorative body panel 108 is illustrated in FIGS. 15 and 16. The rear decorative body panel 108 is a single panel, i.e., of one-piece construction, and basically includes a front wall section 109, two sidewall sections 110A, 110B, and a transverse member or bar 111. The transverse bar 111 is spaced rearwardly of the front wall section 109 and extends between and connects the sidewall sections 110A, 110B, such that the panel 108 has a substantially rigid structure. Preferably, the rear body panel 108 is constructed of a injection-molded, high gloss polymer, but may alternatively be compression-molded or otherwise formed and constructed of any other appropriate materials.

Further, the rear decorative body panel 108 has an outer periphery 118 and is adapted to fit onto a rear portion of the clam shell assembly 62 and the rear body section lower portion 64b. When disposed on the shell assembly 62 and rear body shell 64, the body panel 108 is disposed about or encloses the battery or fuel supply bucket 66 and the rear composite body upper portion 64a (FIGS. 9 and 10). As such, the rear body panel 58 forms part of the structure of the composite body assembly 58, as opposed to being solely or primarily a decorative component. The rear decorative body panel 108 includes openings 112 and 113 designed to fit about portions of the battery or fuel supply bucket 66 and the rear composite body upper portion 64a, respectively, the transverse bar 111 defining and separating the two openings 112 and 113.

As illustrated in FIGS. 1, 15 and 16, the lower portion 64b of the rear body shell 64 is visible when the rear decorative body panel 108 is disposed on the remainder of the composite body assembly 58. The rear composite body lower portion 64b has a periphery 114 that extends or is spaced outwardly on all sides relative to the periphery 118 of the rear decorative body panel 108, so as to protect the rear panel 108 from impact, abrasions or other undesired contact. In other words, as the decorative body panel 108 is inwardly recessed from the rear composite body lower portion 64b, another vehicle or an obstacle (e.g., a tree, a fence post, etc.) will first contact the rear body section 60b during a collision, such that impact with the body panel 108 is substantially prevented.

We claim:

1. A golf car, comprising:
    a frame; and
    a composite body assembly mounted on the frame and configured to increase rigidity of the frame, the composite body assembly including:
        a front body section including at least two molded panels connected together so as to form a clam shell assembly; the molded panels each being formed of a fiber-reinforced polymer; and
        a rear body section formed of a molded fiber-reinforced polymer.

2. The golf car as set forth in claim 1, wherein the front and rear body sections are each formed of a compression molded polymer.

3. The golf car as set forth in claim 1, wherein the frame is formed of at least one of aluminum and steel.

4. The golf car as set forth in claim 1, wherein the frame includes two longitudinally-extending, laterally spaced-apart rails and at least one crossbeam extending between and connecting the two rails.

5. The golf car as set forth in claim 4, wherein the frame further includes a dashboard support bar connected with the two rails.

6. The golf car as set forth in claim 1, wherein the front and rear body sections are each independently attachable to the frame.

7. The golf car as set forth in claim 1, wherein the rear body section includes an integral golf bag support.

8. The golf car as set forth in claim 1, wherein the rear body section includes an integral rear bumper to provide impact resistance to the golf car.

9. The golf car as set forth in claim 1, wherein the rear body section has an access opening, the access opening being located to facilitate access to a motor and associated drive components, and a removable panel configured to obstruct the access opening when disposed on the rear body section.

10. The golf car as set forth in claim 1, wherein the rear body section includes a shell with an open lower end, the shell at least partially bounding an interior chamber.

11. The golf car as set forth in claim 1, further comprising a motor and associated drive system components connected with the frame and at least partially disposed within the interior chamber of the rear body section.

12. The golf car as set forth in claim 1, wherein the clam shell assembly include at least one storage compartment integrally formed in at least one of the panels.

13. The golf car as set forth in claim 1, wherein the clam shell includes an integral dashboard and floorboard.

14. The golf car as set forth in claim 1, wherein the front and rear body sections are each removably connected with the frame.

15. The golf car as set forth in claim 1, further comprising at least one decorative body panel mountable to the composite body assembly and recessed inwardly relative to a periphery of the composite body assembly so as to prevent impact with the decorative body panel.

16. The golf car as set forth in claim 15, wherein the decorative body panels are constructed of a high-gloss polymer.

17. A utility vehicle, comprising:
    a frame; and
    a composite body assembly attachable to the frame and configured to increase rigidity of the frame, the composite body including:
        a front body section including at least two molded fiber-reinforced polymer panels connected together so as to form a front clam shell assembly, and
        a rear body section formed of a molded fiber-reinforced polymer, each one of the front and rear body sections being independently attachable to the frame.

18. The utility vehicle as set forth in claim 17, further comprising decorative body panels formed of a high-gloss polymer, the decorative body panels being attached to the composite body assembly and recessed inwardly relative to a periphery of the composite body assembly such that the composite body assembly extends outwardly of the decorative body panels to protect the decorative body panels.

19. The utility vehicle as set forth in claim 17, wherein the composite body assembly is formed of a compression molded polymer.

20. The utility vehicle as set forth in claim 17, wherein the fame is formed of at least one of aluminum and steel.

21. The utility vehicle as set forth in claim 17, wherein the frame includes two longitudinally-extending, laterally spaced-apart rails and at least one crossbeam extending between and connecting the two rails.

22. The utility vehicle as set forth in claim 17, wherein the front and rear body sections are each removably connected with the frame.

23. The utility vehicle as set forth in claim 17, wherein the clam shell assembly includes an integral dashboard and floorboard.

24. The utility vehicle as set forth in claim 17, wherein the clam shell assembly includes at least one storage compartment integrally formed in at least one of the two panels.

25. The utility vehicle as set forth in claim 17, wherein the rear body section includes an integrally firmed rear bumper, the rear bumper positioned to absorb at least some impact.

26. The utility vehicle as set forth in claim 17, wherein the rear composite body includes a rear access panel positioned to allow access to at least one of a motor and drive components.

* * * * *